Nov. 20, 1951  P. K. RICE  2,575,394
RECIPROCATING PISTON AND CYLINDER MECHANISM
Filed Dec. 27, 1944  2 SHEETS—SHEET 1
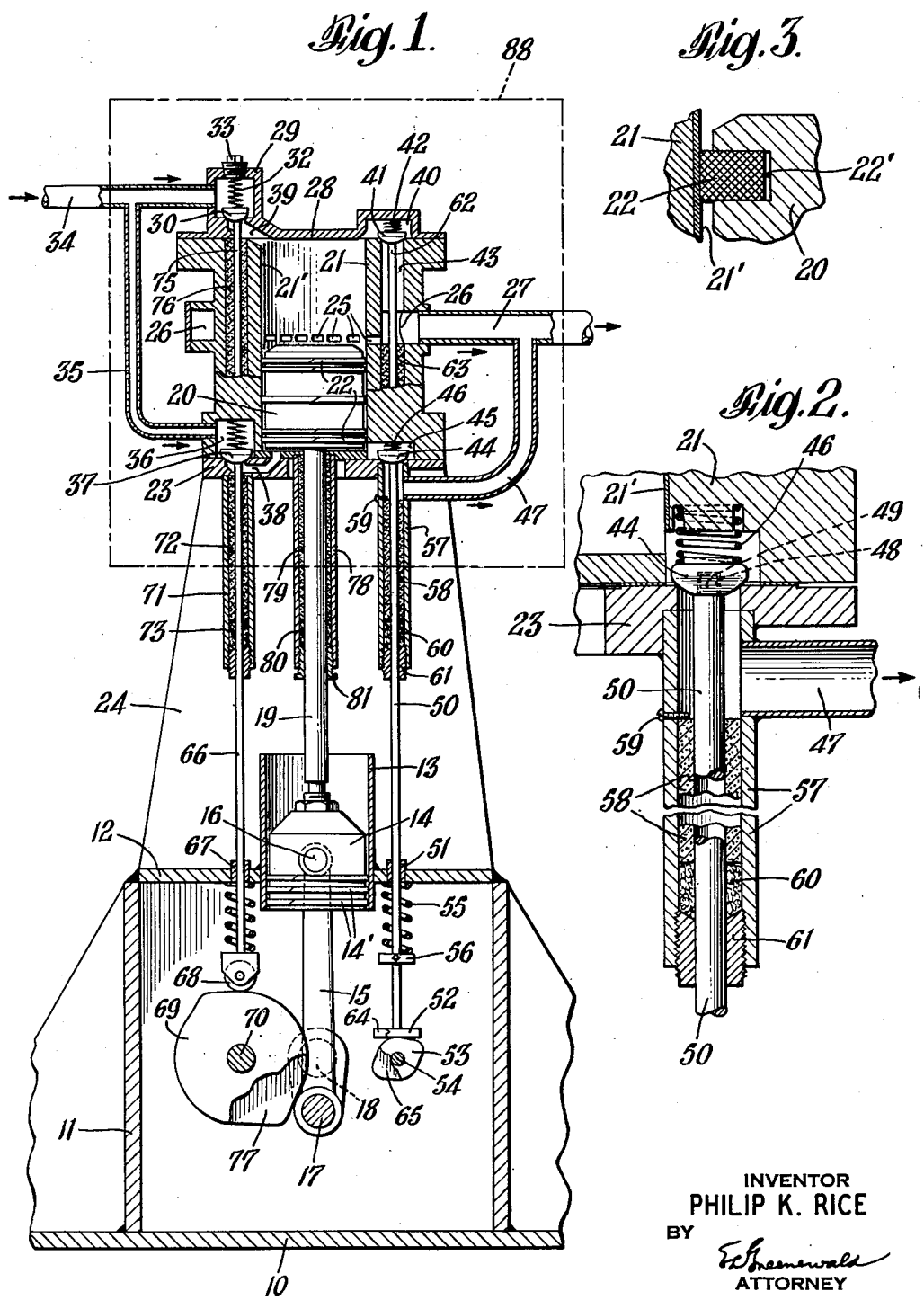
INVENTOR
PHILIP K. RICE
BY
ATTORNEY Nov. 20, 1951 P. K. RICE 2,575,394
RECIPROCATING PISTON AND CYLINDER MECHANISM
Filed Dec. 27, 1944 2 SHEETS—SHEET 2
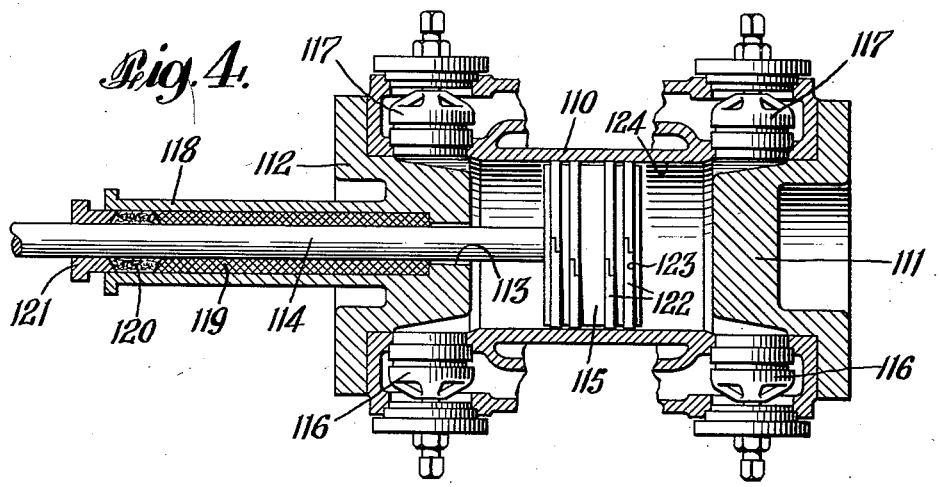
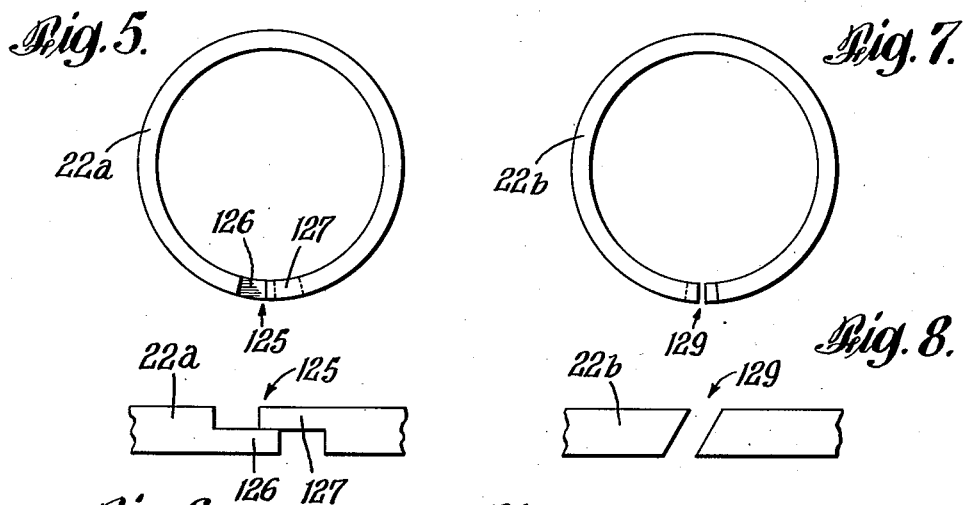
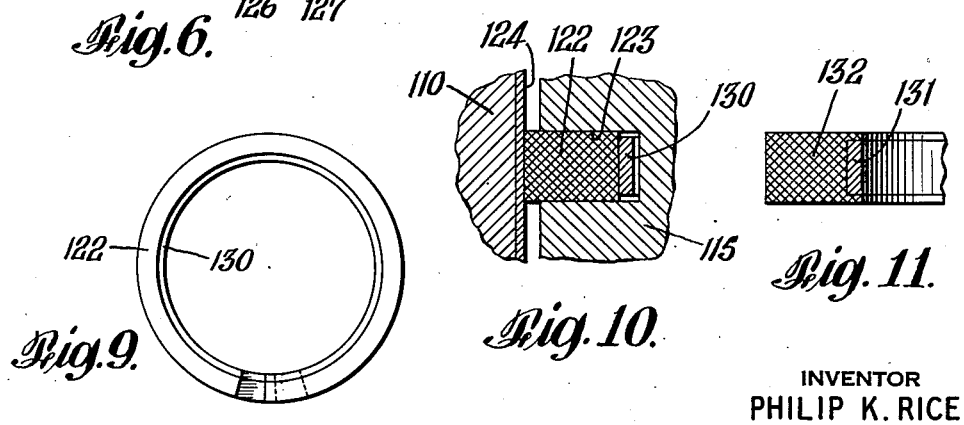
INVENTOR
PHILIP K. RICE
BY
ATTORNEY

UNITED STATES PATENT OFFICE 2,575,394

RECIPROCATING PISTON AND CYLINDER MECHANISM

Philip K. Rice, Kenmore, N. Y., assignor, by mesne assignments, to Union Carbide and Carbon Corporation, a corporation of New York Application December 27, 1944, Serial No. 569,971

11 Claims. (Cl. 309—2)

This invention relates to improvements in reciprocating piston and cylinder mechanism such as engines for the expansion of gas to produce refrigeration and pumps for moving extremely cold fluids and compressing gases such as oxygen and nitrogen. The invention relates more particularly to piston sealing and rod guiding means for such piston and cylinder mechanism and to a reciprocating double acting engine for expanding initially cooled compressed air for cooling such air to a very low temperature.

The sealing of a reciprocating piston within the metal cylinder in which it operates to move a fluid or to be moved by such fluid is customarily accomplished by split rings fitted into annular grooves in the piston. Ordinarily adequate lubrication of the rings and cylinder wall is provided by feeding into the cylinder a suitable lubricant such as oil or the fluid pumped may have adequate lubricating properties. For example, metal piston rings are oil lubricated and piston rings made of laminate phenolic resin have been used in water pumps and in oil pumps, the liquid pumped providing lubrication. Thus lubricated piston rings provide a satisfactory seal and neither the cylinder wall nor the rings wear excessively. When a reciprocating piston machine is used for the expansion of air at very low temperatures or for pumping oxygen and nitrogen at low temperatures, ordinary lubricating means cannot be used and friction prevents successful use of reciprocating machinery for such purposes. Cylinder wall friction not only causes excessive wear but also generates heat that causes undesired effects such as heating the fluid being moved or the gas which is being expanded. The use of fluid lubricants is also objectionable since they tend to contaminate the material being handled and, in the case of oxygen, the requirement for non-combustibility precludes the use of available oily lubricants. Similar difficulties are encountered in means for sealing and guiding piston rods and mechanically operated valve stems.

In processes for liquefying air and for separating air by low temperature rectification, it is customary to provide a large portion of the necessary refrigeration by expanding part of the compressed air with the production of external work for which purpose a reciprocating expansion engine of the single acting type is customarily employed. Such engines have inlet and exhaust valves which are both located at the head end of the engine and a certain amount of undesirable heat exchange occurs between the warm compressed gas admitted into the cylinder and the cold expanded gas due to the exhausting of all the cold expanded gas at the same end of the cylinder. Such single acting engines also have considerable piston packing and lubrication difficulties which require that the crank ends of the cylinders and the pistons be maintained warm, which condition results in the loss of some refrigeration of the expanded gas. For obtaining the benefits of complete expansion, the exhaust valve of a single acting engine should be relatively large or else the machine must run at a very slow speed. Large exhaust valves involve great difficulties caused by operation at very low temperatures.

For these and other reasons the customary expansion engines for the adiabatic expansion of air have in general been large, heavy, slow speed machines. High thermal efficiency is very important for the production of refrigeration and the power obtained from an expansion engine is quite secondary in importance, such power being absorbed in any convenient manner such as by driving a mechanical, electrical, or hydraulic power consuming device or an air compressor. Attempts to operate the customary expansion engine at increased speeds resulted in great loss of thermal efficiency. Among the difficulties encountered in designing a small high speed engine have been: the difficulty of retaining relatively small clearance volumes when the size of a cylinder is decreased; the difficulty of providing a mechanical construction which will permit the operation of the expansion engine at very low temperatures without excessively large clearances for the valve stems and other operating parts while at the same time avoiding excessive friction in such parts where any heat developed by friction would be transferred into the expanded gas; and difficulties of construction required to restrict heat flow from the atmosphere to the expanded gas.

Objects of the present invention are to provide improved means for sealing and guiding a reciprocating plunger or piston in a cylinder which operates without fluid lubricant for a satisfactory life period and which also creates no excessive friction or frictional heat, which provides an effective seal when subjected to and continuously operated at very low temperatures, and which is substantially inert to gases such as oxygen.

Further objects of the invention are to provide improved piston rod and valve rod sealing and packing means which also operates without fluid lubricant, which prevents undesired access of frictional and atmospheric heat to the fluid being handled, and which is substantially inert to the fluid handled especially oxygen.

Further important objects of the present invention are to provide an expansion engine of the reciprocating type, which avoids the difficulties in the operation of engines customarily employed; which is relatively small and of light weight in respect to the quantity of gas or air expanded; which permits the attainment of high thermal efficiency; which will operate at high speed and with high thermal efficiency without exhaust valve and piston packing difficulties; which is double acting so as to have a high capacity for a given size of machine; in which the piston may be maintained at a very low temperature during operation; which has valves, the operation of which are unaffected by large changes of temperature and which operate successfully at extremely low temperatures; and an expansion engine, the valves and passages of which are not readily clogged by the occurrence of solid particles in the gas, such as particles of solidified carbon dioxide.

These and other objects and advantages of this invention will become apparent from the following description and accompanying drawing; in which:

Fig. 1 is a diagrammatic vertical sectional view of an exemplary expansion engine constructed according to the principles of the present invention;

Fig. 2 is an enlarged fragmentary sectional view of the lower auxiliary discharge valve region;

Fig. 3 is a fragmentary sectional view through one of the piston seal ring grooves on an enlarged scale including a portion of the cylinder wall;

Fig. 4 is a semi-diagrammatic sectional view of an exemplary reciprocating piston and cylinder mechanism employing the improved piston and piston rod sealing and guiding means according to the invention;

Figs. 5 and 6 are respectively plan and fragmentary elevational views of a plastic piston ring according to the invention showing a form of joint;

Figs. 7 and 8 are similar plan and fragmentary views showing another form of joint;

Fig. 9 is a plan view of a piston ring according to the invention which is backed by a spring metal expander ring;

Fig. 10 is a fragmentary view on an enlarged scale of a section through the ring of Fig. 9 including portions of the piston and cylinder wall; and Fig. 11 is a view of a cross-section through an alternative form of plastic ring having a spring metal insert incorporated therein.

The expansion engine according to the invention is a type similar to the well known unaflow steam engine in that the expansion cylinder proper is double acting with inlet valves at each end and an exhaust port at the center; the piston having a length equal to or only slightly different from one-half the length of the entire cylinder.

In addition to the unaflow exhaust ports, small auxiliary exhaust valves are provided at each end of the cylinder. The double acting arrangement decreases the effect of heat leak per unit weight of the gas expanded, increases the capacity of the expansion engine for a given size of cylinder, and eliminates the problems encountered in the case of an engine where the bottom of the piston is exposed to the atmosphere as in the case of a single acting expansion engine. The unaflow exhaust port permits the use of relatively small auxiliary exhaust valves which provide small clearance volume. In general a small clearance volume is necessary for the attainment of high thermal efficiency because expansion is usually incomplete and recompression to inlet pressure is seldom practiceu. Usually the major portion of the cold expanded gas passes out through the unaflow ports, thus much less gas flows past the relatively warm inlet ends of the cylinder where heat transfer to the cold gas would have an adverse effect on the thermal efficiency. Valve operating difficuities are eliminated by special construction of the valves and by the use of long sleeves of suitable resin bonded material or of bonded carbon around the valve stems to permit the stem packings to be located in a zone of higher temperature with a minimum transfer to the expanded gas of heat generated in the packing. The piston is preferably sealed by the use of piston rings retained in grooves and having sliding engagement with smooth cylinder walls.

According to the invention, a particularly effective piston guiding and sealing means is found in the use of resin-bonded or fibre reinforced plastic rings preferably operating against a very smooth and hard metal cylinder wall surface such as a polished chromium plated surface.

Referring now to the drawing and particularly Figs. 1 to 3, the expansion engine shown is of a construction which is simplified to illustrate the principles of the invention, and is of the vertical type although a horizontal construction could obviously be equally well employed. The engine has a base 10 on which is mounted a crank case 11 having a flat cover 12 in the center of which is mounted a vertical cylindrical guide 13 for cooperating with a cylindrical type of crosshead 14. The crosshead is preferably provided with oil rings 14' to keep oil from escaping from the crank case. The crosshead 14 is moved vertically in the guide 13 by a connecting rod 15 having its upper end pivoted by a wrist pin 16 to the crosshead 14 and its lower end journaled on a crank pin 17. The crank pin 17 is operatively connected to a horizontal crank shaft 18 which is journaled in bearings supported by the crank case 11. A piston rod 19 is secured to and extends vertically from the crosshead 14 and has secured to its upper end a piston 20. The piston 20 is vertically movable in a cylinder 21 which is preferably slightly longer than twice the length of the piston 20. The piston 20 is provided with several sets of piston rings 22 carried in grooves 22' formed in the piston wall. As previously mentioned, such piston rings 22 may be made of a self-lubricating material such as bonded graphite or a suitable resin-bonded structure which is highly resistant to abrasion and which has adequate strength and elasticity at very low temperatures. Such material also must be substantially inert with respect to the gas material to be handled.

Particularly for the expansion of air at low temperatures, or for pumping such gases as oxygen, it is highly desirable to provide a piston seal that will operate with none or only a slight addition of lubricant and at the same time maintain an effective seal, prevent contact between the piston and the cylinder wall, generate an immaterial amount of frictional heat, and wear out relatively slowly. This has been attained by providing cylinder walls of very smooth hard composition, for example, a polished layer of hard metal plating such as chromium plate. The cylindrical surface 21' of the cylinder 21 is thus preferably chromium plated, ground, and polished. The rings 22 are preferably composed of a plastic with fibrous reenforcement and with or without graphite incorporated therein. Instead of hard metal plating, a cylinder liner of plating of relatively soft metal having good antifriction properties when in rubbing engagement with plastic composition seals or rings may be used, such for example as silver and its alloys. Preferably a plurality of rings 22 are employed, for example, one in a central groove and two in annular grooves 22' near each end of the piston. Each ring 22 is preferably of the one-piece type and may have a cooperating expander ring or the rings may be segmental.

Particularly effective have been found to be rings machined from a laminated stock made from layers of fabric that were bonded with a heat-hardened phenolic resin. To illustrate, duck fabric was impregnated with a heat-reactive cresol-formaldehyde resin in alcohol solution in amount to leave a resin content of about 50 per cent upon drying to a low volatile content of about 2 per cent, layers of the impregnated fabric were then stacked and pressed at about 1000 pounds pressure at 300° F. for about an hour, the laminated stock so formed was afterbaked to a Rockwell hardness of about 105 to 110 (M scale), and rings were machined from the stock. The Rockwell hardness scale referred to is that of the American Society for Testing Materials procedure No. D-785-44T entitled "A Tentative Method of Test for Rockwell Hardness of Plastics and Electrical Insulating Materials." The combination of such rings on the piston and chromium plate on the cylinder walls was found to provide thermal efficiencies as high as 75% over a substantial life period in the operation of the expansion engine.

In general plastics are more or less useful for the preparation of the piston rings, particularly if free from objectionable plasticizing agents, since they are substantially inert to oxygen and under the low temperature operating conditions tend to have low friction coefficients upon reciprocation against the hard metal surface. Besides thermosetting phenol-formaldehyde resins, there are the polyester type resins, such as those prepared from glycols and dibasic acids and hardened by cross-linking by means of vinyl monomers, such as vinyl acetate, styrene, etc.; the glycol esters with the added cross-linking agent are particularly well suited for the bonding of cellulosic fibers, glass cloth, etc., since they gel with rapidity at nominal pressures of 1 to 20 p. s. i. to yield well-bonded structures that can be after-baked to the desirable Rockwell hardness usually ranging between M60 and M110. Heat-setting resins of the melamine and urea type are apt to yield laminated products that are too brittle or hard for machining; but by modifying the manufacturing procedure for making laminates by the inclusion of water or other volatile liquid agent, as described in a patent to Turkington No. 2,183,857, December 19, 1939, toughness and machinability can be materially improved. Likewise vinyl polymers, such as vinyl chloride-vinyl acetate copolymers, polymerized styrene, etc., are according to the Turkington patent, susceptible of improvement in toughness and machinability by the same procedure. Where the resins do not lend themselves particularly well to making laminated plates or tubes for machining into rings, it is generally possible by a casting or molding process, with the inclusion of sufficient proportion of fibers to give strength, to shape piston rings that have a more or less useful operating life. In any of these structures various forms and combinations of fabric such as, linen, canvas, synthetic, and asbestos fabrics can be used as the filler base and graphite can be included as a self-lubricating agent.

The lower end of the cylinder 21 is secured to a head 23 that is supported by suitable supports 24 on the crank case 11. The center of the cylinder 21 is provided with a ring of exhaust ports 25 which are uncovered by the piston 20 when it is at either end of its stroke. The exhaust ports 25 communicate with an annular discharge passage 26 that surrounds the cylinder 21 and communicates with a discharge conduit 27. The upper end of the cylinder 21 is closed by a head 28 having at one edge a housing 29 for an inlet valve 30. The valve 30 is pressed toward its seat by a spring 32 held in place by a plug 33 at the upper end of the housing 29. A compressed gas inlet conduit 34 is connected to discharge into the housing 29. A branch 35 of the inlet conduit 34 connects to a valve housing 36 formed in the lower end of the wall of the cylinder 21. Within the housing 36 a second inlet valve 37 operates to control an inlet port 38 which is formed in the lower head 23 and which communicates with the lower end of the cylinder 21. The lower valve 37 is horizontally offset in relation to the upper valve 30, the valve 37 being in front of the valve 30 so that there is no interference between the respective valve operating devices. The upper valve 30 controls a port 39 in the upper head 28 and connected with the upper end of the cylinder.

Auxiliary exhaust valves to supplement the exhaust ports 25 are also provided in order that a substantially complete discharge of the cold expanded gas occurs on each stroke. Thus in the upper head 28 there is formed a small valve pocket or housing 40 having therein an exhaust valve 41 which is pressed toward its seat by a spring 42, also in the housing 40. The valve 41 controls a passage 43 formed in the wall of the cylinder 21 and connecting with the annular discharge passage 26. A lower exhaust valve 44 operates within a valve housing 45 formed in the lower end of the wall of the cylinder 21 and opening into the lower end of the cylinder. The exhaust valve 44 is urged to its seat by a spring 46 and controls a port in the lower head 23 which is connected by a conduit 47 with the discharge conduit 27. The valve 44 is located in front of the valve 41 so that the respective valve operating mechanisms do not interfere.

The construction of the valve 44 and its operating rod is more clearly shown in Fig. 2. The construction of all the other valves is quite similar and therefore will not be further described. The valve 44 is of button shape and has a recess 48 therein for receiving an end 49 of reduced diameter at the upper end of a valve rod 50. The valve rod 50 extends vertically through a bearing 51 in the cover 12 of the crank case to a point therein where it joins a cam follower 52 in a position to operatively engage a cam 53 which is mounted on a horizontal cam shaft 54. The cam follower 52 is urged into contact with the cam 53 by a spring 55 which is secured between the cover 12 and a collar 56 secured to the rod 50. The valve rod 50 is sealed against loss of gas to the atmosphere by an arrangement including a long tubular housing 57 which is secured gas tightly to the lower head 23 and has therein a long sleeve 58 of self-lubricating material preferably of bonded graphite or a metal having a substantial proportion of graphite therein or a suitable plastic containing graphite. A screw 59 is employed to anchor the sleeve 58 in the housing 57 so that its upper end does not block the conduit 47 which joins the upper end of the housing 57. The sleeve 58 surrounds the rod 50 and forms a guide bushing for the rod as well as providing a heat insulating means of sufficient length to prevent heat exchange between the very cold expanded gas and the packing material 60 that is located near the lower end of the sleeve 57 in a region which is warm. The packing 60 is thus maintained at high-operating efficiency and is held by a packing follower screw 61.

The exhaust valve 41 is similarly mounted at the upper end of a valve rod 62 that extends through a carbon sleeve 63 similar to the sleeve 58 and which has a valve packing and sealing arrangement similar to that for the rod 50 but which is hidden from view in Fig. 1. The valve rod 62 has at its lower end a cam follower 64 that cooperates with a cam 65 also mounted on the cam shaft 54 in back of the cam 53. The valve 37 is operated by a valve stem 66 that extends into the crank case 11 through a bearing 67 in the cover 12. The lower end of the rod 66 carries a cam follower 68 of the roller type positioned for engagement with a cam 69 which is mounted on a horizontal cam shaft 70. The valve stem 66 is provided with sealing means comprising a tube housing 71 having therein a guide sleeve 72 similar to the sleeve 58 and having a packing 73 at its lower end. The upper inlet valve 30 is provided with a valve rod 75 that operates through a carbon sleeve 76 within a vertical passage through the wall of the cylinder 21. The valve rod 75 is provided with a packing arrangement similar to that for the valve rod 66 which packing arrangement is hidden. The rod 75 has a cam follower similar to the cam follower 68 which cooperates with a cam 77 also secured to the cam shaft 70 in back of the cam 69. The cams 53, 65, 69 and 77 are relatively positioned and rotated by suitable gearing of customary construction in timed relation to the motion of the crank pin 17 so that the valves will be opened at the proper times and held open for sufficient lengths of time, the time of opening of the inlet valves 30 and 37 being relatively quite short as compared to the time of opening of the valves 41 and 44. The piston rod 19 is also provided with a packing arrangement similar to that provided for the valve rods including an elongated housing 78 which is secured to and extends downwardly from the lower head 23, and a long sleeve 79 similar in character to the sleeve 58 and disposed within the housing 78 at the lower end of which is a packing 80 secured by a gland screw 81.

To prevent access of atmospheric heat, the entire mechanism within the broken line square 88 in Fig. 1 is preferably enclosed with heat insulation, the packings 60, 73 and 80 extending outside of such insulation.

The expansion engine is especially suitable for use in an air separation plant of the type disclosed in my copending United States patent application Serial No. 567,951 filed December 13, 1944, now Patent 2,517,134, August 1, 1950. In such a plant air is compressed to a pressure between about 150 to 400 p. s. i. and preferably about 270 p. s. i. After drying and cooling the air to about $-105°$ C. a large part of the air is engine expanded. Thus dry air at about 270 p. s. i. is supplied to the inlet valves 30 and 37. When the piston is at the lower end of its stroke, as shown in Fig. 1, the cam 69 begins to lift the valve 37, admitting air into the cylinder under the piston. The valve 37 remains open only during a small portion of the up stroke of the piston, the air admitted driving it upward. The point of the stroke at which the valve recloses is termed the cut-off point and this is determined by the length of the high part on the cam 69. The air admitted to the cylinder expands in volume as it drives the piston upward and the amount of air admitted is preferably enough so that the pressure of the expanded air is still slightly above the desired discharge pressure at the time when the lower edge of the piston uncovers the ports 25. A considerable portion of the expanded air therefore blows out through ports 25 during the time the piston dwells at the upper end of its stroke. Preferably over 50% of the air discharges through the ports 25.

The upper end of the piston comes very close to but does not touch the head 28 and the space remaining, including the volume of the port 39 and valve pocket 40, is called the clearance volume. Some air is preferably trapped in this clearance volume and recompressed to provide a cushioning effect for the piston. The upper inlet valve 30 is now opened by the cam 77 which has made a half turn, and admission of air to the upper side of the piston begins. The auxiliary exhaust valve 44 is now opened by cam 53 and is held open during a considerable part of the down stroke. The valve 44 preferably closes before the piston reaches the lower end of its down stroke in order to trap some air under the piston to provide a cushion. It will be seen that the smaller the clearance volume, the smaller the amount of air that needs to be recompressed.

In the mechanism described, the point of cut-off is predetermined by the length of the high part of the cams 69 and 77 but the cut-off can be made readily adjustable by introducing an adjusting mechanism between the cam follower and the valve rods. The cut-off could be so chosen that the air would be fully expanded to the pressure in the discharge conduit 27 when the ports 25 are uncovered in which case practically no air would discharge through the ports 25. However, an advantage of the present construction is that the larger amount of air provided by a later cut-off can be efficiently expanded so that a considerable portion of the expanded air escapes from the ports 25 when it is in its coldest condition. Only a part of the air is forced to reverse its direction and come into contact with the cylinder heads which were warmed by the compressed air admitted on the previous stroke. When operating at high speed the inertia of the expanded air which resists reversal also causes an added amount to be discharged through the ports 25. The slight excess terminal pressure that exists when the ports 25 are uncovered also aids in expelling solid particles from the cylinder, such as particles of solid carbon dioxide formed when cooling air to low temperatures.

The piston seal and rod seal and guiding arrangement of the invention may be employed in pumps for moving liquid and gaseous oxygen or similar gases at low temperatures. In Fig. 4 is illustrated semi-diagrammatically a pumping mechanism having a cylinder 110 closed at one end by a head 111 and at its other end by a similar closure 112 provided with a central opening 113 for the operating rod 114 of a piston 115 which works in the cylinder 110. Each end of the cylinder is provided with one or more inlet valves diagrammatically indicated at 116 and one or more discharge valves similarly indicated at 117. The closure 112 carries an externally projecting housing 118 through which the rod 114 passes. Fitted within the housing 118 is a tubular guide 119 that supports and guides the rod 114. A suitable sealing packing 120 is also provided between the outer end of the sleeve 119 and a packing gland 121 at the end of the housing 118. The sleeve 119 is preferably composed of a bonded carbon or a resin bonded structure which may contain graphite similar to the valve guide sleeves described in connection with Figs. 1 and 2. Particularly when a resin bonded structure is used for the guide sleeves, the rods are preferably made of polished stainless steel or of a polished chromium plated metal.

The piston 115 is secured to the rod 114 in the customary manner and has a diameter smaller than the cylinder wall diameter so that it can be guided by the rod substantially out of contact with the cylinder wall. The piston is also preferably of hollow construction to reduce its weight and may also be provided with a head end guiding rod that is guided in a guide sleeve similar to the sleeve 119 and supported by the head 111. The piston has a suitable number of annular ring grooves 123 (Fig. 10) in which are fitted piston rings 122 similar to the rings 22 made of resin-bonded structure as previously described. The rings 122 when free, have an outer diameter larger than the diameter of the cylinder wall 124 so that they resiliently maintain contact with the wall 124 in operation. The cylinder wall 124 is preferably of highly polished hard metal such as is prepared by hard chromium plating and polishing a smooth metal surface or polishing a stainless steel surface of a cylinder made of stainless steel or a stainless steel cylinder liner.

The rings, if made of a laminated phenolic resin bonded structure, have excellent resilience at low temperatures so that a split ring construction is very satisfactory. Such construction is shown in Figs. 5 to 8 which also illustrate two suitable forms of joint. In Fig. 5, a ring 22a is shown expanded to its free shape having a diameter larger than the cylinder wall diameter, the ring being provided with a step joint 125 in which the meeting ends of the ring are cut half away, one end from the top, and the other end from the bottom, to provide overlapping tongue portions 126 and 127. Such joint is substantially closed when a new ring is retained within the cylinder. Another form of ring joint 129 is shown in Figs. 7 and 8 and consists of a diagonal split which is also substantially closed when the ring is placed within the cylinder. When operating such rings at very low temperatures it is found that the resin becomes considerably harder and acquires a hard burnished surface when operating against the smooth hard metal surface.

With some resin bonded materials or under certain operating conditions, it may be desirable to provide increased resilience and pressure of the rings against the cylinder wall 124. This can be accomplished as illustrated in Figs. 9 and 10, by employing expander rings 130 which are thin rings of spring metal that exert pressure against the inner wall of the piston ring 122. The ring 130 may be loosely retained in the piston groove 123 behind the ring 122 or may be cemented or otherwise secured to the inside surface of the ring 122. The desired result may also be obtained by moulding a spring metal insert in the plastic ring as indicated by the cross-sectional view of Fig. 11 in which a spring metal insert ring 131 is united by a moulding process with the resin-bonded structure 132 of the piston ring.

Although a preferred embodiment of the invention has been described in detail, it is contemplated that modifications of the apparatus may be made and that some features may be employed without others within the spirit and scope of the invention. For example, the piston seal arrangement, the valve seal arrangement, and the piston rod seal may be employed separately or together not only in expansion engines for producing refrigeration but also in other engines and in compressors for refrigerating fluids or for the compression of gases such as oxygen or nitrogen.

What is claimed is:

1. In a reciprocating piston and cylinder mechanism for operation at very low temperatures having a double acting cylinder with end heads, a piston operating in said cylinder, and a piston rod secured to said piston and passing through one of said heads, said rod having a hard smooth metal surface; rod sealing and guiding means comprising an elongated housing extending from said head around the rod, a rod packing at the outer end of said housing, and a guide sleeve of a solid self-lubricating material between the rod and the housing and between the packing and the cylinder, said guide sleeve being at least as long as the stroke of the piston and rod.

2. An engine according to claim 1 in which said sleeve is composed of bonded graphite.

3. An engine according to claim 1 in which said sleeve is composed of a resin-bonded structure.

4. An engine according to claim 1 in which said rod has a smooth hard corrosion-resistant metal surface coating and said sleeve is composed of a phenolic resin-bonded structure.

5. An engine for the expansion of gas to produce refrigeration comprising a double acting cylinder having an inner wall of smooth hard material, a piston operable therein having annular ring grooves, at least one such groove being close to one end and at least another such groove being close to the other end of said piston; sealing rings fitted in said grooves said rings comprising a laminated plastic; heads closing said cylinder; a piston rod passing through one of said heads and operatively secured to said piston, said rod having a hard metal surface; an elongated housing extending from said one head around the rod; a rod packing at the outer end of said housing; a long guide sleeve of solid self-lubricating material between said rod and said housing and between said packing and said one head, said guide sleeve being at least as long as the stroke of the piston and rod.

6. In a reciprocating piston and cylinder mechanism of the type in which at least one sealing ring is maintained in contact with a cylindrical wall during relative reciprocal movement between the ring and the wall, the combination of a cylindrical wall surface comprising highly polished stainless steel; and sealing rings composed of a resin-bonded structure having a low friction coefficient against said wall surface.

7. In a reciprocating piston and cylinder mechanism of the type in which at least one sealing ring is maintained in contact with a cylindrical wall during relative reciprocal movement between the ring and the wall, the combination of a smooth hard corrosion-resistant metal cylindrical wall surface; and sealing rings composed of a laminated phenolic resin having a low friction coefficient against said wall surface.

8. In a reciprocating piston and cylinder mechanism of the type in which at least one sealing ring is maintained in contact with a cylindrical wall during relative reciprocal movement between the ring and wall, the combination of a smooth hard corrosion-resistant metal cylindrical wall surface; and sealing rings composed of a resin-bonded structure containing finely divided graphite and having a low friction coefficient against said wall surface.

9. In a reciprocating piston and cylinder mechanism of the type in which at least one sealing ring is maintained in contact with a cylindrical wall during relative reciprocal movement between the ring and wall, the combination of a smooth hard corrosion-resistant metal cylindrical wall surface; and sealing rings composed of a resin-bonded structure having a Rockwell hardness greater than about M-60 and which has a low friction coefficient upon reciprocation along said wall surface under low temperature conditions and is substantially inert to nitrogen and oxygen.

10. In a reciprocating piston and cylinder mechanism of the type in which at least one sealing ring is maintained in contact with a cylindrical wall during relative reciprocal movement between the ring and wall, the combination of a smooth hard corrosion-resistant metal cylindrical wall surface; and sealing rings comprising a laminated structure made from layers of fabric bonded with a heat hardened phenolic resin baked to a Rockwell hardness of about 105-M to 110-M.

11. In a reciprocating piston and cylinder mechanism of the type in which at least one sealing ring is maintained in contact with a cylindrical wall during relative reciprocal movement between the ring and the wall, the combination of a smooth, dense chromium plate cylindrical wall surface; and sealing rings composed of a resin-bonded structure having a low friction coefficient against said wall surface.

PHILIP K. RICE.

REFERENCES CITED

The following references are of record in the file of this patent:

UNITED STATES PATENTS

| Number | Name | Date |
| --- | --- | --- |
| 118,857 | Jennings | Sept. 12, 1871 |
| 935,619 | Mesta | Sept. 28, 1909 |
| 1,125,724 | Rosenzweig | Jan. 19, 1915 |
| 1,157,029 | Nordberg | Oct. 19, 1915 |
| 1,281,736 | Woods | Oct. 15, 1918 |
| 1,318,927 | Shepherd | Oct. 14, 1919 |
| 1,426,022 | Thomson | Aug. 15, 1922 |
| 1,466,432 | Gerleman | Aug. 28, 1923 |
| 1,472,295 | Donnelly | Oct. 30, 1923 |
| 1,594,517 | Dufty | Aug. 3, 1926 |
| 1,600,961 | Payne | Sept. 21, 1926 |
| 1,853,562 | Herr | Apr. 12, 1932 |
| 1,886,212 | Mueller | Nov. 1, 1932 |
| 1,905,062 | Schaeffers | Apr. 25, 1933 |
| 1,929,836 | Brown | Oct. 10, 1933 |
| 2,012,778 | Shimer | Aug. 27, 1935 |
| 2,108,392 | Sanders | Feb. 15, 1938 |
| 2,194,000 | Arnold | Mar. 19, 1940 |
| 2,198,654 | Calkins et al. | Apr. 30, 1940 |
| 2,208,975 | Hait | July 23, 1940 |
| 2,239,883 | DeBaufre et al. | Apr. 29, 1941 |
| 2,314,604 | Van der Horst | Mar. 23, 1943 |
| 2,324,547 | Wagner | July 20, 1943 |
| 2,328,895 | Dorman | Sept. 7, 1943 |
| 2,349,170 | Jackman | May 16, 1944 |
| 2,356,482 | Thrush | Aug. 22, 1944 |

FOREIGN PATENTS

| Number | Country | Date |
| --- | --- | --- |
| 384,280 | Great Britain | of 1931 |
| 414,145 | Great Britain | of 1934 |
| 518,284 | Great Britain | Feb. 22, 1940 |
| 524,036 | Great Britain | of 1940 |